US012160681B2

(12) United States Patent
Kabuto et al.

(10) Patent No.: US 12,160,681 B2
(45) Date of Patent: Dec. 3, 2024

(54) VIDEO TRANSMITTER APPARATUS AND VIDEO RECEIVER APPARATUS

(71) Applicant: MAXELL, LTD., Kyoto (JP)

(72) Inventors: Nobuaki Kabuto, Kunitachi (JP); Yuya Ogi, Yokohama (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/113,545

(22) Filed: Feb. 23, 2023

(65) Prior Publication Data

US 2023/0209009 A1 Jun. 29, 2023

Related U.S. Application Data

(63) Continuation of application No. 12/783,329, filed on May 19, 2010, now Pat. No. 11,611,718.

(30) Foreign Application Priority Data

Jul. 3, 2009 (JP) .................................. 2009-158361

(51) Int. Cl.
*H04N 5/44* (2011.01)
*H04N 5/76* (2006.01)
(Continued)

(52) U.S. Cl.
CPC ........... *H04N 5/44* (2013.01); *H04N 21/2368* (2013.01); *H04N 21/4112* (2020.08);
(Continued)

(58) Field of Classification Search
CPC .. H04N 5/44; H04N 21/2368; H04N 21/4112; H04N 21/43076; H04N 21/4341;
(Continued)

(56) References Cited

U.S. PATENT DOCUMENTS 6,536,041 B1   3/2003 Knudson et al.
6,996,837 B1   2/2006 Miura et al.
(Continued)

FOREIGN PATENT DOCUMENTS

CN   101053011 A   10/2007
EP   1 093 319 A1   4/2001
(Continued)

OTHER PUBLICATIONS

Japanese Office Action issued in Japanese Application No. 2009-158361 issued on Oct. 29, 2013.
(Continued)

*Primary Examiner* — Nathan J Flynn
*Assistant Examiner* — Christine A Kurien
(74) *Attorney, Agent, or Firm* — Rimon P.C.

(57) ABSTRACT

A video receiver apparatus, for receiving video from a video transmitter apparatus, comprises: a memory portion for memorizing receiver apparatus information of the video receiver apparatus; and a transmitter/receiver portion for receiving a request for obtaining the receiver apparatus information transmitted from the video transmitter apparatus, and also for transmitting the receiver apparatus information memorized in the memory portion responding to the obtaining request, and wherein, further within the memory portion is memorized history information, changing depending on alternation of the receiver apparatus information, and wherein the receiver portion is able to receive the history information, which the video transmitter apparatus holds therein, as well as, the obtaining request from the video transmitter, and when the received history information from the video transmitter apparatus and the history information, which the video transmitter apparatus holds therein, are inconsistent with each other, then the receiver apparatus
(Continued)

information memorized in the memory portion is transmitted to the video transmitter apparatus.

20 Claims, 5 Drawing Sheets

(51) Int. Cl.
*H04N 21/2368* (2011.01)
*H04N 21/41* (2011.01)
*H04N 21/43* (2011.01)
*H04N 21/434* (2011.01)
*H04N 21/436* (2011.01)
*H04N 21/4363* (2011.01)
*H04N 21/442* (2011.01)

(52) U.S. Cl.
CPC ... *H04N 21/43076* (2020.08); *H04N 21/4341* (2013.01); *H04N 21/43615* (2013.01); *H04N 21/4363* (2013.01); *H04N 21/44231* (2013.01); *H04N 5/76* (2013.01)

(58) Field of Classification Search
CPC ......... H04N 21/43615; H04N 21/4363; H04N 21/44231; H04N 5/76
See application file for complete search history.

(56) References Cited

U.S. PATENT DOCUMENTS

| | | | |
|---|---|---|---|
| 7,028,057 | B1 | 4/2006 | Vasudevan et al. |
| 7,151,575 | B1 | 12/2006 | Landry et al. |
| 7,162,499 | B2 * | 1/2007 | Lees .................... G06F 16/273 |
| | | | 707/999.203 |
| 7,353,158 | B2 | 4/2008 | Unger |
| 2002/0023270 | A1 | 2/2002 | Thomas et al. |
| 2002/0085023 | A1 | 7/2002 | Zustak et al. |
| 2003/0093792 | A1 | 5/2003 | Labeeb et al. |
| 2004/0003403 | A1 | 1/2004 | Marsh |
| 2004/0054910 | A1 | 3/2004 | Ichikawa |
| 2004/0187151 | A1 | 9/2004 | Dunstan |
| 2005/0144651 | A1 | 6/2005 | Prus et al. |
| 2005/0210501 | A1 | 9/2005 | Zigmond et al. |
| 2006/0095638 | A1 * | 5/2006 | Unger .................... G09G 5/006 |
| | | | 348/E5.002 |
| 2006/0129370 | A1 * | 6/2006 | Unger ................. G06F 13/4045 |
| | | | 703/20 |
| 2007/0008302 | A1 | 1/2007 | Uchida et al. |
| 2007/0222779 | A1 | 9/2007 | Fastert et al. |
| 2007/0230909 | A1 | 10/2007 | Mukaide et al. |
| 2008/0046950 | A1 | 2/2008 | Nakajima |
| 2008/0191582 | A1 | 8/2008 | Lutz |
| 2008/0320539 | A1 | 12/2008 | Ohkita |

FOREIGN PATENT DOCUMENTS

| | | |
|---|---|---|
| JP | 5-250239 A | 9/1993 |
| JP | 10-154121 A | 6/1998 |
| JP | 2000-194346 A | 7/2000 |
| JP | 2004-110166 A | 4/2004 |
| JP | 2006-519549 A | 8/2006 |
| JP | 2007-267116 | 11/2007 |
| JP | 2008-048136 A | 2/2008 |
| JP | 2008-102786 A | 5/2008 |
| JP | 2009-004877 | 1/2009 |
| JP | 2009-049787 A | 3/2009 |
| WO | 00/01191 A1 | 1/2000 |
| WO | 2006/052340 A2 | 5/2006 |

OTHER PUBLICATIONS

Chinese Office Action w/ English translation thereof, issued in Chinese Patent Application No. 201010189637.1 dated Nov. 3, 2011.
European Search Report issued in European Patent Application No. EP10250956.9 dated Sep. 24, 2010.
Japanese Office Action issued in Japanese Application No. 2009-158361 dated Apr. 23, 2013 with Partial English Translation.
Notice of Allowance issued in U.S. Appl. No. 12/783,329, dated Nov. 22, 2022.
Final Office Action issued in U.S. Appl. No. 12/783,329, dated Nov. 16, 2020.
Non-Final Office Action issued in U.S. Appl. No. 12/783,329, dated Jun. 2, 2020.
Non-Final Office Action issued in U.S. Appl. No. 12/783,329, dated Sep. 17, 2019.
Final Office Action issued in U.S. Appl. No. 12/783,329, dated Jan. 2, 2019.
Non-Final Office Action issued in U.S. Appl. No. 12/783,329, dated May 2, 2018.
Final Office Action issued in U.S. Appl. No. 12/783,329, dated Nov. 30, 2015.
Final Office Action issued in U.S. Appl. No. 12/783,329, dated Mar. 5, 2015.
Non-Final Office Action issued in U.S. Appl. No. 12/783,329, dated Jun. 25, 2014.
Final Office Action issued in U.S. Appl. No. 12/783,329, dated Jun. 10, 2013.
Non-Final Office Action issued in U.S. Appl. No. 12/783,329, dated Jun. 28, 2012.

* cited by examiner

FIG. 2

| WIRELESS ID |
|---|
| REVISION VALUE |
| EDID: PRODUCT TYPE CODE<br>      RECEIVABLE AUDIO/VIDEO FORMAT<br>      VIDEO/AUDIO LATENCY<br>      COLORIMETRY<br>           :<br>      CHECK SUM |

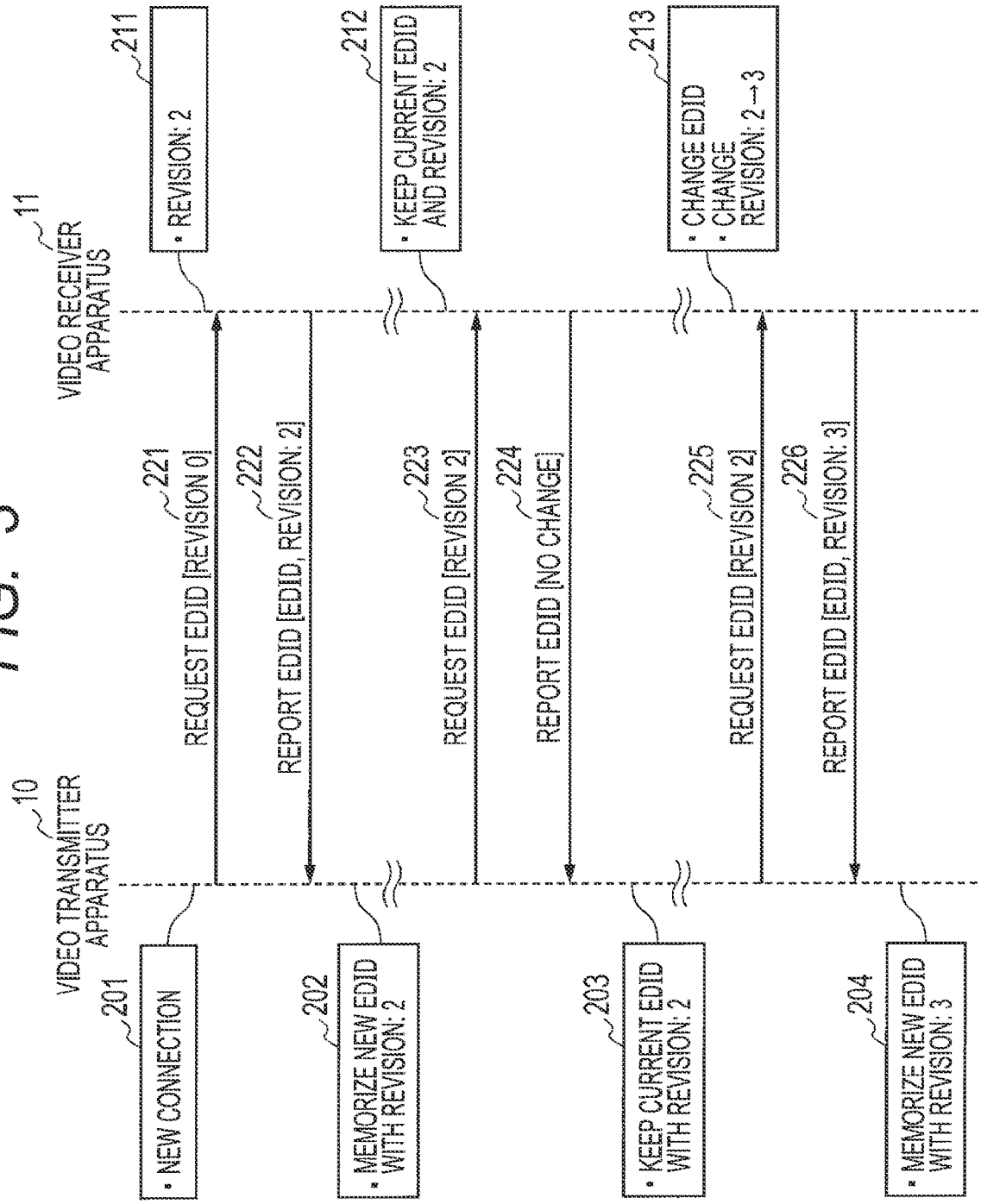

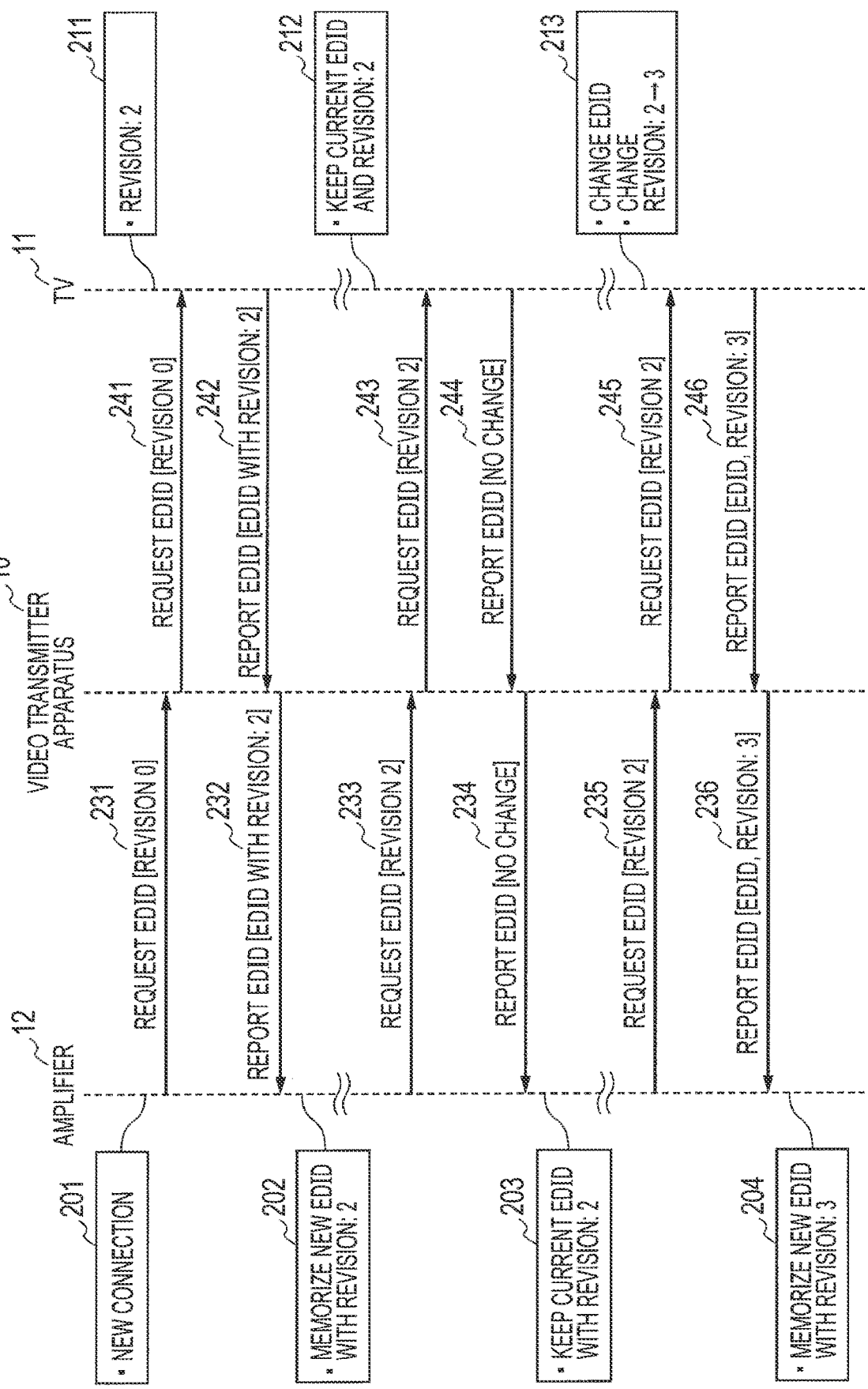

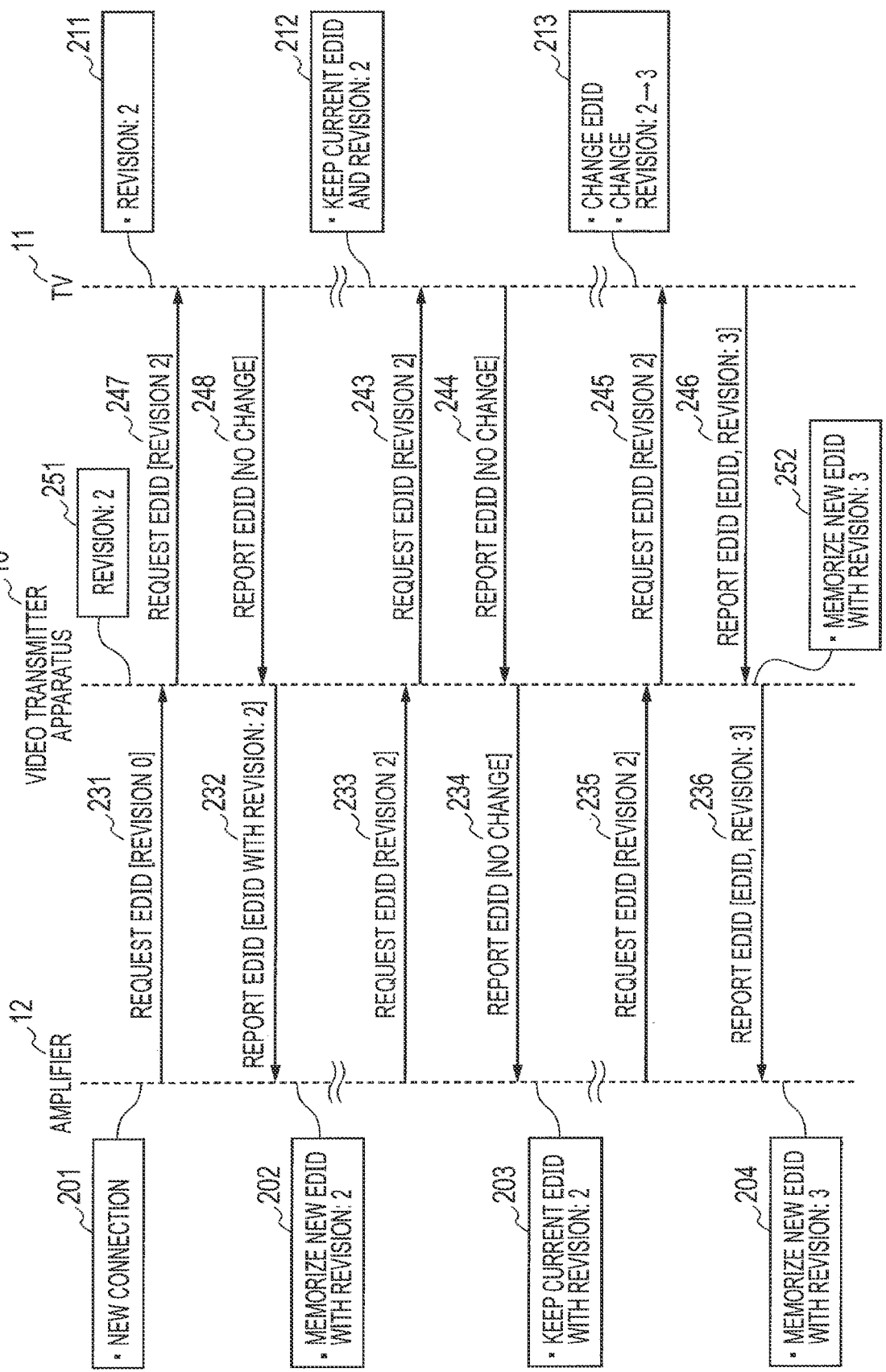

VIDEO TRANSMITTER APPARATUS AND VIDEO RECEIVER APPARATUS

CROSS-REFERENCE OF RELATED APPLICATIONS

This application is a continuation of U.S. application Ser. No. 12/783,329, filed May 19, 2010, which relates to and claims priority from Japanese Patent Application No. 2009-158361 filed on Jul. 3, 2009, the entire disclosure of which is incorporated herein by reference.

BACKGROUND OF THE INVENTION

The present invention relates to a video transmitter apparatus and a video receiver apparatus being able to communicate with equipment at connection by using an interface, such as, on a radio or wireless.

As an interface for conducting signal transmission between a video transmitter apparatus, such as, a HDD (Hard Disc Drive) recorder, a STB (Set Top Box), etc., and a video receiver apparatus, such as, a TV, a monitor, a projector, etc., is already known a HDMI (High-Definition Multimedia Interface:®), for example. Within the system applying the HDMI® therein, the video transmitter apparatus reads the receiver apparatus information indicating the capacity and/or the specification of the video receiver apparatus (for example, EDID (Extended Display Identification Data)), when transmitting a video signal from the video transmitter apparatus to the video receiver apparatus, and thereby it is possible for the video transmitter apparatus to transmit video/audio signals of a format, which is suitable for a capacity and/or a specification of the video receiver apparatus.

In this EDID are described the followings; i.e., a physical address, which is defined under the HDMI® regulation, for example, and a display delay-time, etc., and there are cases where this physical address changes depending on structures of connecting the equipments to the video receiver apparatus and the video transmitter apparatus, and the display delay-time changes depending on a signal processing method of the video receiver apparatus. For this reason, the video transmitter apparatus needs to read out, appropriately, depending on change of EDID of the video receiver apparatus; however, there is a problem of a transmission delay and/or a transmission capacity within an interface, such as, a wireless connection, etc., there are cases where the EDID cannot be read out quickly.

As the conventional arts for dissolving the problems relating to the transmission delay and the transmission capacity within the wireless interface are already known those, which are described in the following Patent Documents 1 and 2, for example.

In the Patent Document 1 is described that, for a source (i.e., the video transmitter apparatus) to readout EDID of a display (i.e., the video receiver apparatus), quickly, a master simulator on the display (the video receiver apparatus) side executes polling on change of a slave (i.e., EDID), continuously, so as to maintain the present condition within a shadow memory within a slave simulator on a source (i.e., the video transmitter apparatus) side, and thereby a readout process from a master (i.e., the video transmitter apparatus) can be executed directly, from the shadow memory of the slave simulator, but without detecting a wireless rink.

Also, in the Patent Document 2 is described, when it is change relating to the EDID information, data of a corresponding item of the EDID information, which is stored within a rewritable memory, is rewritten corresponding to that change, and in addition thereto, an ID unique to a product within that EDID information is rewritten, and the EDID information stored within the rewritable memory is transmitted to a personal computer through a DDC communication function.

PRIOR ART DOCUMENTS

Patent Documents

[Patent Document 1] Japanese PCT Publication No. 2006-519549 (2006); and
[Patent Document 2] Japanese Patent Laying-Open No. 2000-194346 (2000).

BRIEF BURY OF THE INVENTION

In case of applying a video interface, such as, on a radio or wireless, etc., having transmission delay and being insufficient on communication capacity thereof, it is preferable to obtain the receiver apparatus information within a time-period, being as short as possible, when needing the receiver apparatus information, such as, the EDID of the video transmitter apparatus and the video receiver apparatus, etc., and thereby to reduce an influence upon the video transmission while avoiding the communication of the receiver apparatus information when the receiver apparatus information is not needed.

However, with a method of transmitting the change of EDID to the source side, periodically, as is described in the Patent Document 1 mentioned above, there is necessity of executing the periodical EDID transmission, continuously, processes are generated, periodically, even when the EDID information is not necessary on the video transmitter apparatus side. Also, within that described in the Patent Document 2, there is an advantage that it is possible to detect presence/absence of change in the EDID information by only reading out the ID unique to the product; however, there is a case of losing the identification information, as being the ID unique to the product, originally.

An object of the present invention, being accomplished by taking the drawbacks mentioned above into the consideration thereof, is to provide a technology for enabling to obtain the receiver apparatus information suitable for a case when the apparatus information of the video receiver apparatus changes, where the video transmitter apparatus and the video receiver apparatus are connected with, through a wireless interface.

According to the present invention, for accomplishing the object mentioned above, a memory portion for memorizing a history number, which is altered depending on changes of receiver apparatus information of itself, is provided within a video receiver apparatus, while within a video transmitter apparatus is provided a memory portion for memorizing the receiver apparatus information form said video receiver apparatus and said history number thereof, when said video transmitter apparatus obtains the newest receiver apparatus information of said video receiver apparatus, it transmits the history number memorized in the memory portion of the video transmitter apparatus to the video receiver apparatus, while the video receiver apparatus compares between the history number transmitted from the video transmitter apparatus and the history number of itself, which is memorized in the memory portion thereof, wherein the newest receiver apparatus information and the newest history number (i.e., the history number memorized in a first memory portion) to the video transmitter apparatus.

According to the structure of the present invention, since the video receiver apparatus transmits the newest receiver apparatus information to the video transmitter apparatus, when the history number from the video transmitter apparatus differs from, it is possible to bring an amount or volume of transmission for connecting between the video transmitter apparatus and the video receiver apparatus, down to the minimum. Therefore, according to the present invention, it is possible to obtain the receiver apparatus information, suitably in case when the apparatus information of the video receiver apparatus is changed.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 2 is a view for showing an example of information, which is memorized in a memory portion of the video receiver apparatus, according to the embodiment of the present invention;

FIG. 3 is a view for showing an example of a flowchart for showing communication steps between the video transmitter apparatus and the video receiver apparatus, according to the embodiment of the present invention;

FIG. 4 is a view for showing other example of a flowchart for showing communication steps between the video transmitter apparatus and the video receiver apparatus, according to the embodiment of the present invention; and FIG. 5 is a view for showing further other example of a flowchart for showing communication steps between the video transmitter apparatus and the video receiver apparatus, according to the embodiment of the present invention.

DETAILED DESCRIPTION OF THE PREFERRED EMBODIMENTS

Figure 1:
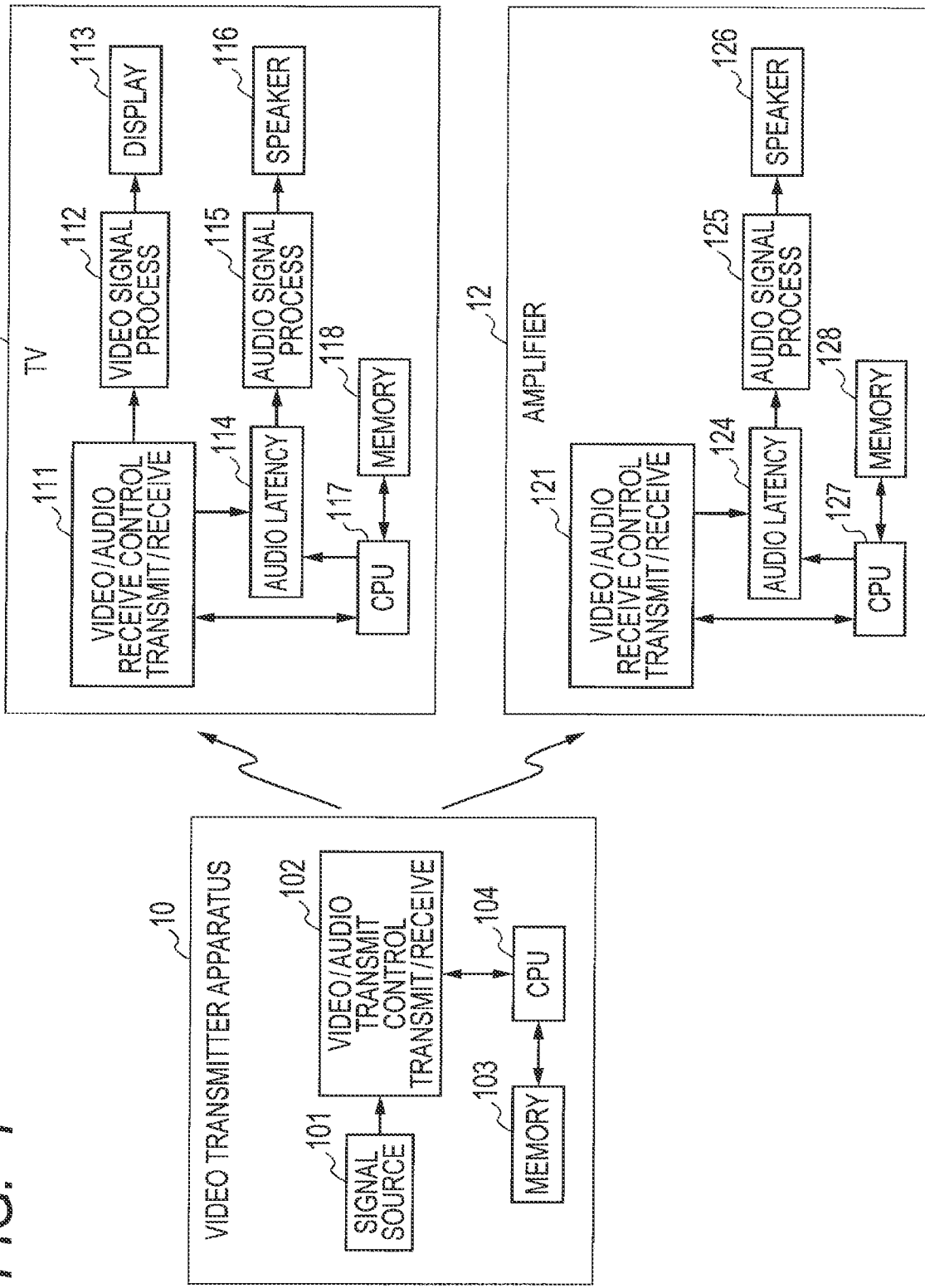
FIG. 1 is a configuration view of a system, wirelessly connecting a video transmitter apparatus and a video receiver apparatus, according to an embodiment of the present invention.

Hereinafter, embodiments according to the present invention will be fully explained or mentioned by referring to the attached drawings.

FIG. 1 attached is a configuration view for showing an example of a system, according to an embodiment of the present invention, wherein a video transmitter apparatus 10 is connected with a TV 11 and an amplifier 12, each being a video receiver apparatus, through a wireless interface. Herein, the video transmitter apparatus 10 may be, for example, a HDD player or a DVD player, etc., and it has s signal source 101, a transmitter/receiver portion 102 for transmitting/receiving video/audio signals and a control signal, a memory portion 103, and a CPU 104.

On the other hand, the TV 11, being the video receiver apparatus, has a transmitter/receiver portion 111 for transmitting/receiving video/audio signals and a control signal, a video signal processor 112, a display portion 113, an audio delay or latency portion 114, an audio signal processor 115, a speaker 116, a CPU 117 and a memory portion 118. Also, the amplifier 12 has a transmitter/receiver portion 121 for transmitting/receiving video/audio signals and a control signal, an audio delay or latency portion 124, an audio signal processor 125, a speaker 126, a CPU 127 and a memory portion 128.

With the present embodiment, in the system having such structures as mentioned above, history information, indicating a renewal history (i.e., version information) of that receiver apparatus information together with the receiver apparatus information, is memorized into the memory portion 118 of the video receiver apparatus, and this receiver apparatus information and the history information are transmitted to the video transmitter apparatus 10, to be memorized in the memory portion 103. And, it is characterized in that, when the video transmitter apparatus 10 obtains new (i.e., being changed) receiver apparatus information, within the video receiver apparatus, the history information, which is memorized within the memory portion 103 of the video transmitter apparatus 10, and the history information, which is memorized in the memory portion 118 of the video receiver apparatus, are compared with, and when they are inconsistent with, new receiver apparatus information is transmitted to the video transmitter apparatus 10. First of all, explanation will be given, hereinafter, on a mechanism of transmitting the video/audio signals within the present embodiment. However, in the embodiment shown below, since a numerical value, which is incremented every time when EDID is renewed, is used therein, then "history information" will be called as "history number".

Within the memory portion 118 of the TV 11 are memorized the followings; as is shown in FIG. 2, for example, a wireless ID and a history number, and the EDID indicating the capacity and/or the specification of that TV, as the receiver apparatus information. The EDID includes, for example, a product code of that TV 11 and/or video/audio formats receivable, video/audio latency, a colorimetry, etc. However, hereinafter, the receiver apparatus information will be called "EDID".

The TV 11 transmits or reports EDID memorized in the memory portion 118 to the video transmitter apparatus 10, via the transmitter/receiver portion 111 on the TV 11 side. The video transmitter apparatus 10 receives the EDID from the TV 11 with the transmitting/receiving function of the control signal within the transmitter/receiver portion 102, and memorizes all or a part of the EDID received, in the memory portion 103 within the video transmitter apparatus 10. The CPU 104 determines optimal video/audio transmission formats, by referring to a receiving capacity and a specification of the TV 11, which are described in the EDID memorized in the memory portion 103. And, the CPU 104 controls the signal source 101 in such that it produces a video signal and an audio signal corresponding to that video/audio formats determined. The video/audio signals outputted from the signal source 101 are transmitted from the transmitter/receiver portion 102, and are received by the transmitter/receiver portion 111 of the TV 11. The video/audio signals received by the transmitter/receiver portion 111 are reproduced on the display portion 113 and through the speaker 116, passing through the video signal processor 112 and the audio signal processor 115, respectively. When the video signal processor 112 uses therein a frame memory, etc., since it needs a time for video processing, there may be a possibility that reproduction of the video is delayed with respect to the audio reproduced from the speaker. For the purpose of compensating an amount of this vide delay or latency, delay or the latency of the video accompanying with video processing within the video signal processor 112 may be compensated, and video and audio may be synchronized with, by entering the audio latency portion 114 therein.

However, the memory portions 118 and 103 are connected with the transmitting/receiver portions 111 and 102 via the CPUs 117 and 104, respectively; however, the EDID may be transmitted/received, by connecting them directly, not passing through the CPUs.

Also, in the place of the speaker built within the TV 11, high quality sound may be reproduced by means of the amplifier 12. In this case, the amplifier 12 transmits or reports the EDID indicating the receiving capacity and/or the specification of that amplifier 12, which is/are memorized in the memory portion 128, passing through the transmitter/receiver portion 121 on the amplifier 12b side to the video transmitter apparatus 10. The video transmitter apparatus 10 receives the EDID from the amplifier 12 by the function of the transmitting/receiving portion 102 for transmitting/receiving the control signal(s), and memorizes all or a portion of the EDID received into the memory portion 103 within the video transmitter apparatus 10. The CPU 104 determines the optimal audio transmission format, by referring the receiving capacity and the specification of the amplifier 12, which are described in the EDID memorized in the memory portion 103. And, the CPU 104 controls the signal source 101 so as to produce the audio signal corresponding to the audio format that is determined. The audio signal outputted from the signal source 101 is transmitted from the transmitting/receiving portion 102, and it received by the transmitter/receiver portion 121 of the amplifier 12. The audio signal transmitted/received by the transmitter/receiver portion 121 is delayed by a time-period to be taken by the video processing within the video signal processor 112, depending on necessity thereof, by means of the audio latency portion 124. Thereafter, for example, a surround process, etc., is treated, depending on necessity thereof, within the audio signal processor 125, and the sound is reproduced by one (1) or plural numbers of speakers, which is/are connected with the amplifier 12. However, although the memory portion 128 is connected with the transmitter/receiver portion 121 passing through the CPU 127, the EDID may be transmitted/received directly, not passing through the CPU, by connecting the transmitter/receiver portion 121 and the transmitting/receiving portion 102.

The delay time mentioned above can be changed depending on contents of the video processing corresponding to a display mode of the TV 11. For example, in case of a mode displaying a signal of 60 Hz in the frame rate after converting into that of 240 Hz, much time is necessary to be produced for the video processing of such the conversion. On the other hand, it is so determined that no frame rate conversion mentioned above is executed for the purpose of preventing the video display from being delayed responding to the operation thereof, in case of "a game mode" for displaying the video signal from a game machine, and in the case of this mode, the delay time is shorten.

The EDID mentioned above includes so-called real time information therein, which changes depending on a connecting structure and/or a video processing content (a display mode) of equipment, such as, the physical address mentioned above and/or the delay time (or latency) of video/audio, etc. For this reason, the video transmitter apparatus 10 needs to confirm on whether the EDID memorized in that memory portion 103 is a newest one or not. For such purpose thereof, within the present embodiment, a revision value is given to the EDID, in advance, for the video receiving apparatus, such as, the TV 11 or the amplifier 12. With such a revision value, an initial value thereof is "0", for example, and it is executed with renewal, such as, increasing by one (1), for example, every time when the content of EDID is changed, etc. When the video transmitter apparatus 10 needs the newest EDID (when obtaining), the video transmitter apparatus 10, after giving the revision value memorized in the memory portion 103, transmits or reports a request for obtaining the EDID to the video receiver apparatus. The video receiver apparatus makes comparison between the revision value from the video transmitter apparatus 10 and the revision value memorized in the memory portion 103 of the video receiver apparatus, and in case where they are inconsistent with, thus, only when changing is made, the (changed) EDID is transmitted from the video receiver apparatus to the video transmitter apparatus. With this, it is possible to delete the EDID transmission in many cases when no renewal is made. Since a relatively large transmission capacity is needed for the transmission of EDID, there may be a possibility that a necessary transmission capacity cannot be ensured or maintained for transmitting the video/audio signals when transmitting the EDID (i.e., the transmission capacity is divided for the EDID transmission, for the video/audio signals). However, according to the present embodiment, since no EDID is transmitted to the video receiver apparatus when no change is made on the EDID, there can be obtained an effect of avoiding influences upon the video/audio transmission.

Explanation will be given, hereinafter, upon a detailed example of a method of confirming and obtaining the newest EDID, with using the revision value in relation to the present embodiment, by referring to FIG. 3. This FIG. 3 is a flowchart for showing communication messages between the video transmitter apparatus 10, according to the present embodiment, and the video receiver apparatus 11, such as, the TV, etc., and also changes of the contents memorized within the respective memory portions 103 and 118.

When the video transmitter apparatus 10 is connected with the video receiver apparatus (herein, the TV 11 is the example), firstly (a new connection condition 201), since there is no EDID memorized in the memory portion 103 of the video transmitter apparatus 10, a message 221 is transmitted to the video receiver apparatus 11, for requesting to obtain the EDID, which is added with the revision value "0". This message 221 may be transmitted, periodically. Preferably, the revision value "0" may be used as a meaning of no EDID memorized. On the other hand, the video receiver apparatus 11 sets up the revision value, for example "2", other than "0", in advance, within the memory portion 118 (condition 211). The CPU 117 of the video receiver apparatus 11 reads out the revision value, which is memorized in the memory portion 118, and compares it with the revision value, which is added to the message 221 for requesting to obtain the EDID from the video transmitter apparatus 10. The CPU 117 determines that both are inconsistent with, since the revision value from the video transmitter apparatus 10 differs from the revision value, which is shown in the condition 211 of the memory portion 118, and it makes determination that there is necessity of transmitting the EDID to the video transmitter apparatus 10. And, the CPU 117 controls the transmitter/receiver portion 111, in such that the EDID memorized in the memory portion 118, and also renewal information thereof, the revision value "2", are transmitted to the video transmitter apparatus 10. The video transmitter apparatus 10 receives the EDID and "2" of the revision value, which are transmitted from the video receiver apparatus 11 by the transmitter/receiver portion 102 thereof, and the CPU 104 makes the memory portion 103 memorize the EDID and the revision value received memorized therein (condition 202).

Thereafter, when the video transmitter apparatus 10 needs a newest EDID, the CPU 104 of the video transmitter apparatus 10 controls the transmitter/receiver portion 102 in such that it reads out the revision value "2", which is memorized in the memory portion 103 thereof, to be added to an EDID requesting message 223, and thereby to transmit or report this to the video receiver apparatus 11. Upon receipt of the EDID requesting message and the revision value "2" from the video receiver apparatus 11 by the transmitter/receiver portion 111 of the video receiver apparatus 11, further the CPU 117 reads out the revision value, which is memorized in the memory portion 118 of the video receiver apparatus 11 at present, and compares it with the revision value received. Since the revision value is "2" as it is, without change in the EDID memorized in the memory portion 118 (condition 212), and since it is coincident or consistent with the revision value, which is added to the EDID requesting message 223 received, then the CPU 117 controls the transmitter/receiver portion 111 in such that it transmits or reports a message 224 indicating that there is no change in the EDID to the video transmitter apparatus 10. The message 224 indicating that there is no change in the EDID is received by the transmitter/receiver portion 102, and upon basis of the message received, the CPU 104 of the video transmitter apparatus maintains the condition 203 memorized in the memory portion 103 (i.e., no change in the EDID), and uses the EDID memorized in that memory portion 103 as the newest EDID.

In case when the video transmitter apparatus 10 needs the newest EDID, again, the CPU 104 adds the revision value "2" memorized in the memory portion 103 to a message 225 requesting to obtain EDID, so as to transmit or report it to the video receiver apparatus 11 by the transmitter/receiver portion 102, and it is received by the transmitter/receiver portion 111 of the video receiver apparatus. Herein, it is assumed that, within the video receiver apparatus 11, the EDID thereof is changed, for example, by change of connecting structure of the equipment to the video receiver apparatus 11 (for example, a DVD player is newly connected to the TV 11, etc.), before receiving that message 225. In this case, the CPU 117 changes the revision value, which is memorized in the memory portion 118 of the video receiver apparatus 11 (i.e., "2" before change of EDID), to "3", by increasing it by "1" (condition 213). As a result thereof, the revision value of the video receiver apparatus 11 under that condition differs from the revision value "2" of the EDID requesting message 225 received by the transmitter/receiver portion 111. As a result thereof, the CPU 117 of the video receiver apparatus 11 reads out the newest EDID and the revision value "3", which are changed, and transmits or reports them to the video transmitter apparatus 10 by means of the transmitter/receiver portion 111. The video transmitter apparatus 11 receives that newest EDID and the revision value "3" by the transmitter/receiver portion 102, and further memorizes the EDID and the revision value, which are received, into the memory portion 103 by means of the CPU 104 (i.e., rewriting the data of the memory portion 103) (condition 204). Hereinafter, within the video receiver apparatus 11 are executed various controls, such as, production of video/audio signals, etc., with using the EDID corresponding to the revision value "3", which is memorized in the memory portion 103, until the EDID of the video receiver apparatus 11 is changed, again.

In this manner, the revision value is increased, one by one, and when it reaches to the maximum value (for example, 255), it is preferable to increase it, sequentially, from "1", but jumping "0" indicating no memory. Also, in case where there is no effective EDID data because of any reason, it is also possible that the video receiver apparatus transmits or reports the revision value "0" omitting the EDID.

As was mentioned above, since transmission of the EDID is generated only when the video transmitter apparatus needs the newest EDID and in case where the revision value differs, it is possible lower the transmission capacity and the transmission time necessary for the EDID communication down to the minimum.

Also, in addition to the revision value, comparison may be made in common, also upon a character data of the EDID, such as, a check sum included in the EDID, etc., to use the EDID memorized in the memory portion 103 of the video transmitter apparatus 10, only when both the revision value and the character data are consistent with, while no EDID is transmitted from the video receiver apparatus when either one of them is inconsistent with; thereby increasing the reliability of that data. Since the check sum within the EDID lies in each block, then the revision value may be also given for each block, so as to execute data comparison for each block. As the character data may be used a CRC (Cyclic Redundancy Check) or a hash function, etc.

Further, with conducting estimation, in common with, upon the consistence/inconsistence of a wireless ID, which is used when establishing the communication network of the radio, etc., it is possible to expect a further increase of the reliability thereof. In more details, while memorizing the wireless ID of the video receiver apparatus in the memory portion 103 of the video transmitter apparatus 10, in advance, comparison is made between the wireless ID of the video receiver apparatus 11 memorized and the wireless ID of the video receiver apparatus, which is designated as a destination of transmission of the EDID request message, within that video transmitter apparatus 10. This can be achieved by transmitting or reporting the revision value "0" indicating that there is no EDID memorized within the video transmitter apparatus 10 to the video receiver apparatus 11, when they are inconsistent with.

In the example mentioned above, it is the case where the video transmitter apparatus 10 reads therein the EDID of the TV 11, being the video receiver apparatus; however, the similar processes or steps can be applied in case where the amplifier 12, being another video receiver apparatus, reads the EDID of the TV 11 therein. For example, in the example shown in FIG. 1, when reproducing the sound by the amplifier while muting the sound of the TV 11 (i.e., when outputting the audio by the speaker 126, which is connected with the amplifier, in the place of the speaker 116 built within the TV 11), the video delay amount of the TV 11 mentioned above may be obtained as the EDID of the TV 11, and thereby delaying the audio within the audio latency portion 124 by an amount of the video delay obtained. With doing in this manner, it is effective for synchronizing the audio output of the amplifier 12 and the video display on the display portion 112 of the TV 11, when outputting the audio by means of the amplifier 12.

FIG. 4 is a flowchart for showing the communication messages among three (3); i.e., the amplifier 12—the video transmitter apparatus—the TV 11, and changes of memory contents of the memory portions 128 and 118, respectively. Herein, it is assumed that the memory portion 128 of the amplifier 12 has a function similar to that of the memory portion 103 of the video transmitter apparatus 10. The EDID request message and the EDID transmit message are transmitted or reported from the transmitting/receiving function portion for the control signals within the transmitter/receiver portion 121 of the amplifier 12, passing through the transmitting/receiving function portion for the control signals within the transmitter/receiver portion 102 of the video transmitter apparatus 10, to the transmitting/receiving function portion for the control signals within the transmitter/receiver portion 111 of the TV 11. The communication message from the TV 11 to the amplifier 12 is also transmitted or reported passing through the video transmitter apparatus 10, in the similar manner to that mentioned above. Other than the communication message relay function by means of the video transmitter apparatus 10, they are same to the communications of the EDID and the message and the revision value between the video transmitter apparatus 10 and the TV 11 shown in FIG. 3. Thus, it is enough to read, the processes similar to those, which are executed by the CUP 104, the transmitter/receiver portion 102 and the memory portion 103 of the video transmitter apparatus 10, explained in FIG. 3, are executed, in the place thereof, by the CPU 127, the transmitter/receiver portion 121 and the memory portion 128 of the 12, in FIG. 4. In this example, there is no necessity of memorizing all EDID of the TV 11 into the memory portion 128, which are received by the transmitter/receiver portion 121 of the amplifier 12, and it is also possible to memorize only the information, for example, relating to the video delay amount.

In the example shown in FIG. 4, though the video transmitter apparatus 10 executes only the role or function of relaying the communication between the amplifier 12 and the TV 11, but may have a function other than that. For example, the video transmitter apparatus 10 may transmit or report, together with the EDID request message, the revision value, being replaced by a newer revision value than that the memory portion 103 has therein, in the place of the revision value received from the amplifier 12, if the revision value that the memory portion 103 thereof has is newer than the revision value received from the amplifier 12 (i.e., a numeral of the revision value that the memory portion 103 has therein is large), when transmitting or reporting the EDID request message attached with the revision value, which is received from the amplifier 12, to the TV 11. An example of that will be shown in a flowchart shown in FIG. 5. If the EDID request message attached with the revision value "0" comes or arrives from the amplifier 12, when the revision value that the memory portion 103 of the video transmitter apparatus 10 has therein is "2" (condition 251), the CPU 104 of the video transmitter apparatus 10 determines that the revision value that the video transmitter apparatus has therein is new, and then the EDID request message 247 attached with the revision value "2" that the memory portion 103 has therein is transmitted to the TV 11 by means of the transmitter/receiver portion 102. Also, the video transmitter apparatus 10 has no necessity of transmitting or reporting all of the EDID received from the TV 11 to the amplifier 12, and it is also possible to transmit or report only the information, for example, relating to the video delay or latency amount.

The CPU 117 of the TV 11 compares between the revision value received and the revision value "2" that the memory portion 118 of the TV 11 has therein, and since both are equal to each other, then it turns a message 248 indicating no change of EDID back to the video transmitter apparatus 10 through the transmitter/receiver portion 11. The video transmitter portion 10, receiving the message 248 indicating no change of EDID, transmits or reports the EDID, which the memory portion 103 has, and the revision value "2", to the amplifier 12 by means of the EDID message. The amplifier 12 receives this EDID message 232 by the transmitter/receiver portion 121, and memorizes all or a portion of the EDID received into the memory portion 128 (condition 202). In this manner, with replacing the revision value from the amplifier 12 by the new revision value, which relay equipment (in this example, the video transmitter apparatus 10) has, there can be obtained an advantage of suppressing an amount or volume of communication between the TV 11 and the video transmitter apparatus 10.

Also, when the video transmitter apparatus 10 receives the new EDID and the message 246 from the TV 11, the EDID of the memory portion 103 of the video transmitter apparatus 10 and the revision value are renewed (condition 252), and thereby there can be obtained an advantage of reducing the message relating to EDID between the video transmitter apparatus 10 and the TV 11, and minimize the transmission capacity and/or the transmission time.

Though the explanation was give on the EDID, as the example of the receiver apparatus information; however it should not be limited to the EDID, but may be information unique to the video receiver apparatus, such as, a power consumption, a brightness of screen, a time to be used, etc. Also, with the embodiment mentioned above, the explanation was given on the TV and the amplifier, as the video receiver apparatus, as the example thereof; however, the present invention should not be restricted to this, of course, and it is needless to say that it may be other equipments or apparatuses.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A video transmitting apparatus comprising:
   wireless communication circuitry configured to communicate with a display apparatus, the wireless communication circuitry being configured to transmit, while the wireless communication is connected to the display apparatus after a new connection is established with the display apparatus, a first request message and a second request message to the display apparatus;
   audio/video signal generation circuitry configured to generate an audio/video signal stream;
   a memory; and
   control circuitry configured to:
      transmit, to the display apparatus via the wireless communication circuitry, the first request message together with a first number;
      receive capability information relating to the display apparatus from the display apparatus via the wireless communication circuitry;
      store the received capability information relating to the display apparatus in the memory;
      determine at least one parameter relating to the audio/video signal stream based on the received capability information relating to the display apparatus;
      cause the audio/video signal generation circuitry to generate the audio/video signal stream based on the determined at least one parameter relating to the audio/video signal stream;
      transmit the generated audio/video signal stream to the display apparatus via the wireless communication circuitry; and
      when a predetermined condition is met, transmit, to the display apparatus via the wireless communication circuitry, the second request message together with a second number which is different from the first number,
wherein one of the first number transmitted with the first request message to the display apparatus and the second number transmitted with the second request message to the display apparatus is generated by increasing the other of the first number and the second number by an arbitrary number.

2. The video transmitting apparatus according to claim 1, wherein the capability information relates to either EDID (Extended Display Identification Data), normal rated power, brightness of display panel, or total operating time of the display apparatus.

3. The video transmitting apparatus according to claim 1, wherein the predetermined condition is met when identification information for wireless communication received from the display apparatus matches identification information stored in the memory.

4. The video transmitting apparatus according to claim 1, wherein the predetermined condition is met when specific information included in EDID (Extended Display Identification Data) received from the display apparatus matches specific information stored in the memory.

5. The video transmitting apparatus according to claim 4, wherein the specific information included in the EDID is either a checksum value, a CRC (Cyclic Redundancy Check) value, or a hash value of the EDID.

6. The video transmitting apparatus according to claim 1, wherein the control circuitry is further configured to transmit the first request message with the first number or the second request message with the second number periodically to the display apparatus via the wireless communication circuitry.

7. The video transmitting apparatus according to claim 1, wherein the control circuitry is further configured to store a third number in the memory, the third number being different from the first number, the third number being received from the display apparatus via the wireless communication circuitry.

8. The video transmitting apparatus according to claim 7, wherein the third number is changed to a fourth number by the display apparatus, and
wherein the control circuitry is further configured to store the fourth number in the memory, the fourth number being received from the display apparatus via the wireless communication circuitry.

9. A video transmitting apparatus comprising:
wireless communication circuitry configured to communicate with a display apparatus, the wireless communication circuitry being configured to transmit, while the wireless communication is connected to the display apparatus after a new connection is established with the display apparatus, a first request message and a second request message to the display apparatus;
audio/video signal generation circuitry configured to generate an audio/video signal stream;
a memory; and
control circuitry configured to:
transmit, to the display apparatus via the wireless communication circuitry, the first request message together with a first number;
receive capability information relating to the display apparatus from the display apparatus via the wireless communication circuitry;
store the received capability information relating to the display apparatus in the memory;
determine at least one parameter relating to the audio/video signal stream based on the received capability information relating to the display apparatus;
cause the audio/video signal generation circuitry to generate the audio/video signal stream based on the determined at least one parameter relating to the audio/video signal stream;
transmit the generated audio/video signal stream to the display apparatus via the wireless communication circuitry;
when a predetermined condition is met, transmit, to the display apparatus via the wireless communication circuitry, the second request message together with a second number which is different from the first number;
store a third number in the memory, the third number being different from the first number and received from the display apparatus via the wireless communication circuitry; and
store a fourth number in the memory, the fourth number being generated by the display apparatus based on the third number and received from the display apparatus via the wireless communication circuitry,
wherein one of the first number transmitted with the first request message to the display apparatus and the second number transmitted with the second request message to the display apparatus is generated by increasing the other of the first number and the second number by an arbitrary number.

10. The video transmitting apparatus according to claim 9, wherein the capability information relates to either EDID (Extended Display Identification Data), normal rated power, brightness of display panel, or total operating time of the display apparatus.

11. A method for controlling a video transmitting apparatus, the video transmitting apparatus comprising: wireless communication circuitry configured to communicate with a display apparatus, the wireless communication circuitry being configured to transmit, while the wireless communication is connected to the display apparatus after a new connection is established with the display apparatus, a first request message and a second request message to the display apparatus; audio/video signal generation circuitry configured to generate an audio/video signal stream; and a memory, the method comprising:
transmitting, to the display apparatus via the wireless communication circuitry, the first request message together with a first number;
receiving capability information relating to the display apparatus from the display apparatus via the wireless communication circuitry;
storing the received capability information relating to the display apparatus in the memory;
determining at least one parameter relating to the audio/video signal stream based on the received capability information relating to the display apparatus;
causing the audio/video signal generation circuitry to generate the audio/video signal stream based on the determined at least one parameter relating to the audio/video signal stream;
transmitting the generated audio/video signal stream to the display apparatus via the wireless communication circuitry; and
in response to meeting a predetermined condition, transmitting, to the display apparatus via the wireless communication circuitry, the second request message together with a second number which is different from the first number,
wherein one of the first number transmitted with the first request message to the display apparatus and the second number transmitted with the second request message to the display apparatus is generated by increasing the other of the first number and the second number by an arbitrary number.

12. The method according to claim 11, wherein the capability information relates to either EDID (Extended Display Identification Data), normal rated power, brightness of display panel, or total operating time of the display apparatus.

13. The method according to claim 11, wherein the second request message is sent in response to determining that identification information for wireless communication received from the display apparatus matches identification information stored in the memory.

14. The method according to claim 11, wherein the second request message is sent in response to determining that specific information included in EDID (Extended Display Identification Data) received from the display apparatus matches specific information stored in the memory.

15. The method according to claim 14, wherein the specific information included in the EDID is either a checksum value, a CRC (Cyclic Redundancy Check) value, or a hash value of the EDID.

16. The method according to claim 11, further comprising transmitting the first request message with the first number or the second request message with the second number periodically to the display apparatus via the wireless communication circuitry.

17. The method according to claim 11, further comprising storing a third number in the memory, the third number being different from the first number, the third number being received from the display apparatus via the wireless communication circuitry.

18. The method according to claim 17,
wherein the third number is changed to a fourth number by the display apparatus, and
wherein the method further comprising storing the fourth number in the memory, the fourth number being received from the display apparatus via the wireless communication circuitry.

19. A method for controlling a video transmitting apparatus, the video transmitting apparatus comprising: wireless communication circuitry configured to communicate with a display apparatus, the wireless communication circuitry being configured to transmit, after a new connection is established with the display apparatus, a first request message and a second request message to the display apparatus while the wireless communication circuitry is connected with the display apparatus; audio/video signal generation circuitry configured to generate an audio/video signal stream; and a memory, the method comprising:
transmitting, to the display apparatus via the wireless communication circuitry, the first request message together with a first number;
receiving capability information relating to the display apparatus from the display apparatus via the wireless communication circuitry;
storing the received capability information relating to the display apparatus in the memory;
determining at least one parameter relating to the audio/video signal stream based on the received capability information relating to the display apparatus;
causing the audio/video signal generation circuitry to generate the audio/video signal stream based on the determined at least one parameter relating to the audio/video signal stream;
transmitting the generated audio/video signal stream to the display apparatus via the wireless communication circuitry;
in response to meeting a predetermined condition, transmitting, to the display apparatus via the wireless communication circuitry, the second request together with a second number which is different from the first number;
storing a third number in the memory, the third number being different from the first number, the third number being received from the display apparatus via the wireless communication circuitry; and
storing a fourth number in the memory, the fourth number being generated by the display apparatus based on the third number, the further number being received from the display apparatus via the wireless communication circuitry,
wherein one of the first number transmitted with the first request message to the display apparatus and the second number transmitted with the second request message to the display apparatus is generated by increasing the other of the first number and the second number by an arbitrary number.

20. The method according to claim 19, wherein the capability information relates to either EDID (Extended Display Identification Data), normal rated power, brightness of display panel, or total operating time of the display apparatus.

* * * * *